Jan. 11, 1927.
H. P. HANSON
THEFT PREVENTING DEVICE
Filed Feb. 21, 1921
1,613,794
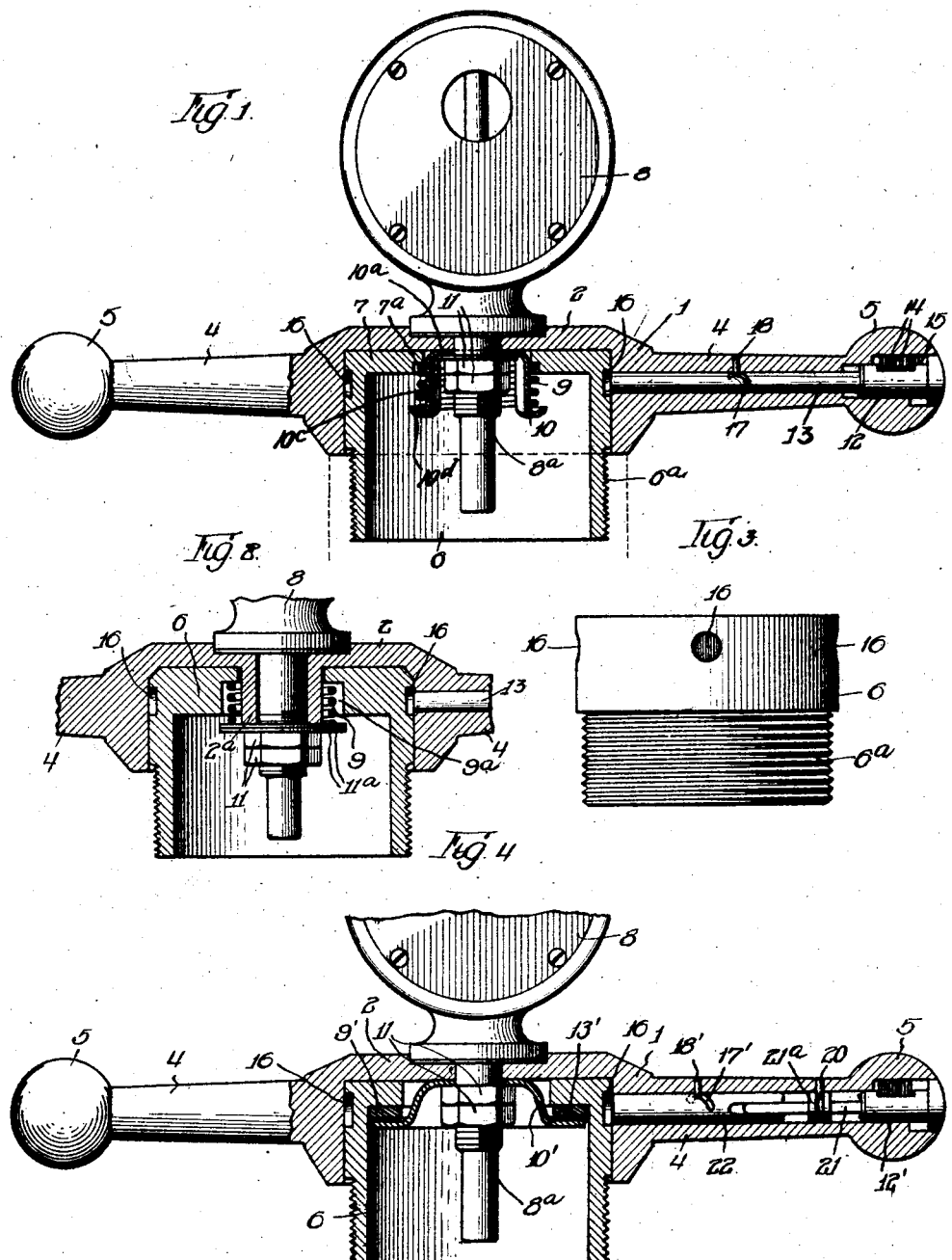

Patented Jan. 11, 1927.

1,613,794

UNITED STATES PATENT OFFICE.

HANS PETER HANSON, OF CHICAGO, ILLINOIS, ASSIGNOR TO WHITE PRODUCTS COMPANY, OF CHICAGO, ILLINOIS, A CORPORATION OF ILLINOIS.

THEFT-PREVENTING DEVICE.

Application filed February 21, 1921. Serial No. 446,602.

This invention relates generally to theft-preventing devices, and pertains particularly to improved construction and arrangement of means for mounting a detachable rotary member such as a screw nut, bushing, or cap, upon a proper support, such as a post, tube, or the like, whereby, when the detachable member is seated, it cannot be manipulated for removal without preliminary operation of a locking or enabling mechanism which is controlled by a key, combination lock, or the like. The invention is designed primarily as a closure for automobile radiator nipples, in which use it is designed to function also as a mounting and retaining means for a motor meter which is operatively associated with the radiator, or of an ornament. The application and use of the invention, however, is obviously much broader than this.

The general object of the invention is the provision of such a device which will form a secure retaining device, a tight closure for the radiator, a proper mounting for the motor meter or ornament, which may be readily applied, which cannot be removed excepting in authorized fashion, which may be manufactured economically, which retains its operativeness under contemplated conditions of usage, and which forms a graceful and sightly attachment in the intended disposal.

One of the particular objects of the present invention is the provision of a construction wherein the same standard parts may be used in devices adapted for attachment to mountings of different sizes and kinds.

Another particular object is the provision of a construction wherein the mounting of the supported motor meter or ornament maintains the several parts in assembled relationship.

Another particular object is the provision of a construction whereby the motor meter or ornament may be adjusted and retained in its desired position after the attachment of the device to the radiator nipple.

Another object of the invention is the provision of a construction wherein concealed and protected key controlled means is utilized for controlling removal of the device from the mounting, and wherein injury of the securing members incident to attempts to back the device off its mounting is prevented.

Other and further objects of the invention will be pointed out hereinafter, indicated in the appended claims, or will be obvious from an understanding of the invention from the following description and the illustrative embodiment shown in the drawing forming a part of this specification. It is to be understood that, while the present disclosure is predicated upon what I now regard as a preferred embodiment of the invention, the same is here presented for the purpose of illustration merely, and is not to be construed as a limitation upon the invention as hereinafter claimed, short of its true scope in the art.

In the said drawing—

Fig. 1 is a sectional elevation of an embodiment of the invention adapted for use as a closure for an automobile radiator tube;

Fig. 2 is a sectional elevation of a modified form of assembly;

Fig. 3 is an elevational view of the attaching member constituting one of the elements of the combination; and Fig. 4 is a section similar to Fig. 1 of a device embodying a modified form of assembly means and locking mechanism.

An understanding of the invention may best be had by reference to the drawings in detail by means of the reference characters applied thereto. Let it be understood that the numeral 1 designates generally an operating member which includes a cap portion 2 and laterally extending handles 4 which preferably terminate in symmetrically formed enlargements 5. The cap portion 2 is chambered to provide a housing for the upper portion of the connecting member 6. The latter is in the form of a sleeve or bushing rotatably mounted within the housing of the cap portion and having a bearing portion on which the cap rotates and a part which may be screw-threaded as at 6ª to qualify it for attachment to a cooperating post or tube. Obviously, the screw threads may be formed on the external surface of the attaching member, or on the internal surface thereof, and in the latter event the height of the attaching member should be such that it does not extend out of the housing formed by the cap portion. The attaching member has a top flange 7 shaped to afford an axial aperture with a seat portion 7ª in the nature of a depression thereabout. The cap portion forms a mounting for a motor meter or ornament 8 and is provided with a central opening for the passage of the stem 8ª thereof, so that the latter may extend into the attaching member through the axial aperture of the top flange. A coiled extension spring 9 is adapted to seat with one end in the retaining seat 7ª, wherein it may be held under compression by an assembly yoke. The form of the latter is illustrated in Fig. 1, wherein it may be seen that it includes a base plate 10ª having a central aperture and depending arms 10ᶜ terminating in laterally hooked portions 10ᵈ adapted to engage over the end coil of the spring 9. The size and shape of the yoke are such that it may extend through the axial aperture of the attaching member and have frictional bearing engagement with the under surface of the cap portion 2, the axial opening accommodating the passage of the stem 8ª. In the assembling of the parts, the attaching member being nested in the cap portion, the stem 8ª is inserted through the axial apertures of said members, the spring 9 placed in the seat 7ª, the yoke placed on the stem 8ª with its hooked members 10ᵈ engaging over the end of the spring, and the nuts 11 then screwed on to the stem to the extent necessary to force the base plate 10ª into frictional engagement with the under surface of the cap portion 2 and to compress the spring 9 against the flange 7. After the nuts are thus screwed into position, the threads on the stem 8ª may be upset behind them to prevent their being backed off.

With the parts thus assembled, the operating member and the retaining member are qualified for relative rotary movement coaxially, but such rotation is restrained to an extent by the frictional engagement of the under surface of the cap portion 2 against the upper surface of the flange 7 and the base plate 10ª.

As a means for operably connecting the operating member and the attaching member so that the latter may be rotated with the former, I provide locking mechanism, preferably of the form illustrated in Fig. 1. This locking mechanism includes a lock cylinder 12, of familiar type having the tumblers 14 which are projected from the periphery of the cylinder by spring pressure, and are retracted by a key inserted into the cylinder. To this lock cylinder is connected an axially extending plunger 13. One of the arms 4 of the operating member is bored longitudinally to accommodate the cylinder 12 and the plunger 13, and is slotted at one side of the bore in the enlargement 5 to form a retaining seat 15 for the tumblers 14. The longitudinal extent of the cylinder 12 and plunger 13 is such that when the face of the former is substantially flush with the end of the handle 4, the inner end of the plunger 13 is retracted within the operating member. The extent of the bore in which the cylinder 12 is housed, however, is sufficient to permit inward movement of the cylinder to an extent sufficient to project the inner end of the plunger 13 toward the attaching member 6. The latter is provided with one or more seats 16 in the nature of depressions in its peripheral wall in position to align with the plunger 13. These seats preferably are of conveniently larger area than the cross-section of the rod 13, to provide ample clearance and to insure the entrance of the rod into them when it is projected. As a means for retaining the locking mechanism in its mounting, and for accomplishing this projection and retraction upon rotation of the lock cylinder, the plunger 13 is provided with a spiral groove 17 in which fits a pin 18 mounted in the handle portion 4.

In the normal, or retracted position of the locking mechanism, the tumblers 14 register in the seat 15, and thereby retain the locking mechanism against rotation. Upon insertion of the proper key into the lock cylinder, the tumblers 14 are retracted out of the seat 15, so that the cylinder may be rotated. Upon such rotation in the proper direction, the plunger 13 and cylinder will be propelled inwardly due to the camming action of the pin 18 on the side of the groove 17, so that the end of the rod will be projected into the seat 16 in alignment therewith. This forms a positive connection between the operating member 1 and the attaching member 6, whereby the latter is held for rotation with the former. Consequently, the device may be attached to the intended mounting by rotary movement imparted to the attaching member through manipulation of the operating member. Such manipulation may be accomplished by means of the handle portions 4 to screw the attaching member securely on to the mounting. The attaching member thus being securely seated, the locking mechanism is reversely rotated by means of the key, the lock rod thereby being retracted from engagement in the seat 16, and the cylinder restored to the position wherein the tumblers 14 may register in the seat 15 upon withdrawal of the key. With the parts in such position, the attaching member 6 having been screwed tightly on to its mounting, it cannot be unscrewed by manipulation of the operating member, and, all parts of the attaching member being covered either by the housing portions of the operating member or by the mounting on which it is seated, the device cannot be detached. The operating member and connecting member being thus susceptible of relative rotation, the latter may be set at its proper position to place the dial of the motor meter as desired, in which position it is retained frictionally.

In the device illustrated in Fig. 4, parts are shown in modified forms and arrangements. In this modification the compressible means which forms a part of the assembly connection is constituted of a compressible washer 9' which is seated on the top flange of the attaching member, and compressed there-against by the lateral portions of the assembly yoke 10'. A metal washer 13 may be interposed between them to afford a bearing surface.

In the modified form of locking mechanism illustrated in Fig. 4, the lock cylinder 12', while rotatable in the operating member, is retained against longitudinal movement by a pin 20 which rides in an annular groove 21ª in the plunger. The plunger rod is formed of two sections, one section, designated 21, being connected to the lock cylinder, and having a non-circular portion 21ª slidably interfitting a grooved portion of the cooperating section 22. The latter section carries the spiral groove 17' with which the pin 18' cooperates to induce longitudinal movement of the section 22 upon its rotation. Such rotation is induced by operation of the lock cylinder 12 as above described, the slidable connections of the sections 21 and 22 transmitting the rotary movement and accommodating the longitudinal shifting of the latter section relative to the former. The inner extremity of the section 22 is adapted for cooperation with the seats of the attaching member, and the extent of longitudinal movement given it by the rotation of the lock cylinder is sufficient to extend it into locking position, and to retract it to disengaging position.

By virtue of the construction, devices embodying the invention are adapted for attachment to a great variety of mountings simply by a provision of the proper form or size of attaching member 6. Consequently, a dealer in automobile accessories, for example, will find it necessary to carry in stock simply the various kinds of attaching members adapted for different kinds of automobiles, any of which attaching members he may assemble with the other parts of the device as occasion demands. The use of the invention, therefore, requires no special forming or modification of the mounting upon which the device may be used, provides a secure attachment for the rotary cap and motor meter whereby unauthorized removal thereof is prevented, insures the proper locking of the parts in place, as the key cannot be removed until the operating connection is displaced, and forms a tight closure which enables accurate registration of radiator temperatures by the motor meter.

In Fig. 2 is illustrated a modified form of spring mounting wherein the yoke member of Fig. 1 is omitted, and the body 2 of the cap is provided with a concentric flange 2ª depending within the sleeve 6 about the stem of the motor meter, and spaced from the sleeve to provide an annular recess 9ª for the spring 9. Washers 11ª, overlapping the spring, serve to compress the same under the action of the units 11, the washer in its extreme position abutting on the end of the flange, whereby the stress applied to the spring is determined as to amount.

I claim:

1. In a device of the class described the combination comprising an operating member, an engaging member rotatably housed therein and adapted for attaching engagement with a support, a stem extending through said members on their axes of rotation, means retained by said stem for holding said members in assembled relationship, and disengageable means for connecting said members to permit rotation of the engaging member by manipulation of the operating member.

2. In a device of the class described, in combination, an annular member having a terminal flange partially closing one end thereof, a cap in covering relationship to said flange, a stem secured axially to the cap and extending past the flange into the annular member, and flexible means cooperating with the stem and the flange to retain the cap and annular member in assembly for unrestricted relative rotation.

3. A closure for automobile radiators and the like comprising an engaging member adapted for operative engagement with the radiator nipple, an operating member housing the engaging member and operable to effect engagement and disengagement thereof with the nipple, a motor meter mounted on the operating member with its stem extending into the connecting member on the axis of said members, and means retained by said stem for retaining said members for relative rotation in assembled relationship to form a closure for the radiator nipple.

4. In a device of the class described the combination of an engaging member having a part adapted for connective engagement with a support by rotary movement, an operating member housing the same and operable to engage it with a support, a yoke supported on the operating member and extending within the engaging member, and a spring retained in compression between said yoke and the engaging member to maintain the operating and engaging members in operative relationship.

5. A device of the class described comprising an annular engaging member adapted for attachment to a support, an operating member housing the same, a connection joining said members to permit unrestricted relative rotation of the two, said connection including an axially disposed stem secured to the operating member and an elastic member retained under compression on the engaging member by said stem.

6. A device of the class described comprising an engaging member and an operating member conjoined to prevent their separation, said engaging member being adapted for connection to a support by rotary movement, said operating member constituting a housing for the engaging member, an axial connection maintaining said members in yielding engagement, and means for connecting said members to permit rotation of the engaging member by operation of the operating member.

7. In a device of the class described the combination of an annular engaging member, an operating member mounted co-axially thereon to form a housing therefor, said operating member having a handle whereby it may be rotated on its axis, and a connection retaining said operating and engaging members against separation, said connection including a compressible means effective to resist separation of said members.

8. In a device of the class described the combination of an annular engaging member, an operating member mounted co-axially thereon to form a housing therefor, said operating member having a handle whereby it may be rotated on its axis, a connection retaining said operating and engaging members against separation, said connection including a compressible means effective to resist separation of said members, and means for securing said operating and engaging members for rotation together.

9. In a device of the class described the combination of an annular engaging member adapted for connection to a support by rotary movement, an operating member housing said engaging member and mounted for relative co-axial rotation, said operating member having a handle whereby it may be rotated, means for connecting the operating member to the retaining member to permit rotation of the latter by the former, and a connection effective to maintain said members against separation, said connection including a yielding member operable to permit a limited tilting movement of the operating member on the engaging member.

10. A theft preventing device comprising an attaching member adapted for attachment to and detachment from a support by rotary movement and provided with a bearing portion, a handle having a body embracing and housing the bearing portion of said attaching member and freely rotatable thereon, means housed by said members for interlocking them for simultaneous rotation, and operable means housed in the outer end portion of the handle for holding said means in ineffective relationship, whereby under the control of the said operable means the detachment of the device from its support by an authorized person is permitted and by one unauthorized is precluded.

11. A theft preventing device comprising an attaching member having a thread engaging portion and a bearing portion, a handle having a body embracing and housing the bearing portion of said attaching member and freely rotatable thereon, means for interlocking the members for simultaneous rotation and including a plunger mounted upon the handle member, means housed within the handle for normally holding the plunger retracted, and means housed in the outer extremity of said handle and operable therein to permit authorized and to prevent unauthorized release of the plunger.

12. A theft preventing device comprising an attaching member having a screw threaded portion and a bearing portion, a handle having a body embracing and housing the bearing portion of said attaching member and freely rotatable thereon, means for interlocking the members for simultaneous rotation and including a plunger mounted upon one of the members, means for normally holding the plunger retracted, means to permit authorized and to prevent unauthorized release of the plunger, said plunger capable of rotation on its longitudinal axis, and means for inducing longitudinal movement of the plunger upon rotary movement thereof.

13. A theft preventing device comprising an attaching member having a screw threaded portion and a bearing portion, a handle having a body embracing and housing the bearing portion of said attaching member and freely rotatable thereon, said handle including a handle bar extending radially from the body of the handle, means for interlocking the members for simultaneous rotation and including a plunger mounted upon the handle bar, the attaching member having a keeper to receive one end of the plunger when the members are interlocked, means housed in the outer end portion of the handle bar for normally holding the plunger retracted, said means being operable in the handle bar to permit and to prevent release of the plunger.

14. A theft preventing device comprising an attaching member having a post engaging portion and a bearing portion provided with one or more sockets, a handle member comprising a body embracing and housing the bearing portion of said attaching member and freely rotatable thereon and a handle bar extending laterally from the body, said handle bar having a longitudinal bore extending to the interior of said body, means for interlocking the attaching member and the handle for simultaneous rotation and including a plunger mounted for endwise movement in the bore of the handle bar, the socket of the attaching member capable of receiving the inner end of the plunger for interlocking the members, and means housed in the outer end portion of the handle bar for normally holding the plunger retracted from the socket, said means being operable to permit release of the plunger.

15. An attachment for automobile radiators comprising a cap having laterally directed handles whereby it may be rotated, an annular engaging member housed in said cap for co-axial rotation and adapted for connection to a radiator nipple by rotary movement, a display device mounted on the cap and having a portion extending into the engaging member, connecting means housed within the cap for retaining the display device in position, a rotary member housed in the extremity of one of the handles and engageable therewith to prevent its movement therein, and a plunger movably housed in the handle and forming a shiftable connection between said rotary member and the engaging member.

In testimony whereof I have hereunto subscribed my name.

HANS PETER HANSON.